United States Patent [19]

Di Marco

[11] 4,164,880
[45] Aug. 21, 1979

[54] TOOL HOLDER CARTRIDGE FOR CHUCKING LATHES

[76] Inventor: Joel E. Di Marco, 4288 Revere Pl., Culver City, Calif. 90230

[21] Appl. No.: 852,805

[22] Filed: Nov. 18, 1977

[51] Int. Cl.² .............................................. B23B 29/00
[52] U.S. Cl. .................................................... 82/36 R
[58] Field of Search ............................... 82/36 R, 36 A

[56] References Cited

U.S. PATENT DOCUMENTS

| | | | |
|---|---|---|---|
| 767,598 | 8/1904 | Search et al. | 82/36 R |
| 2,407,201 | 9/1946 | Woodward | 82/36 R |
| 3,063,318 | 11/1962 | Schlappal | 82/36 A |
| 3,213,722 | 10/1965 | Maglica | 82/36 R |
| 3,298,091 | 1/1967 | Bowman | 82/36 R |
| 3,333,493 | 8/1967 | Bullard et al. | 82/36 R |
| 3,359,840 | 12/1967 | Soleau | 82/36 R |
| 4,080,854 | 3/1978 | Peterson | 82/36 R |

FOREIGN PATENT DOCUMENTS

| | | | |
|---|---|---|---|
| 608585 | 1/1935 | Fed. Rep. of Germany | 82/36 A |
| 2206937 | 8/1973 | Fed. Rep. of Germany | 82/36 R |

*Primary Examiner*—Harrison L. Hinson

[57] ABSTRACT

A cartridge for tool holders on production lathes, to be permanently set up for use as required and removable for subsequent replacement in exact position at the same station of a turret for which setup was initially made, and comprised of an adapter and a setup arm comprising a cantilevered extension of the top face of the lathe turret at the index station where it is to be reused and positioned by said top face and the side face of the turret and along which faces the adapter is initially adjustable to be fixed transversely of the turning axis.

18 Claims, 6 Drawing Figures

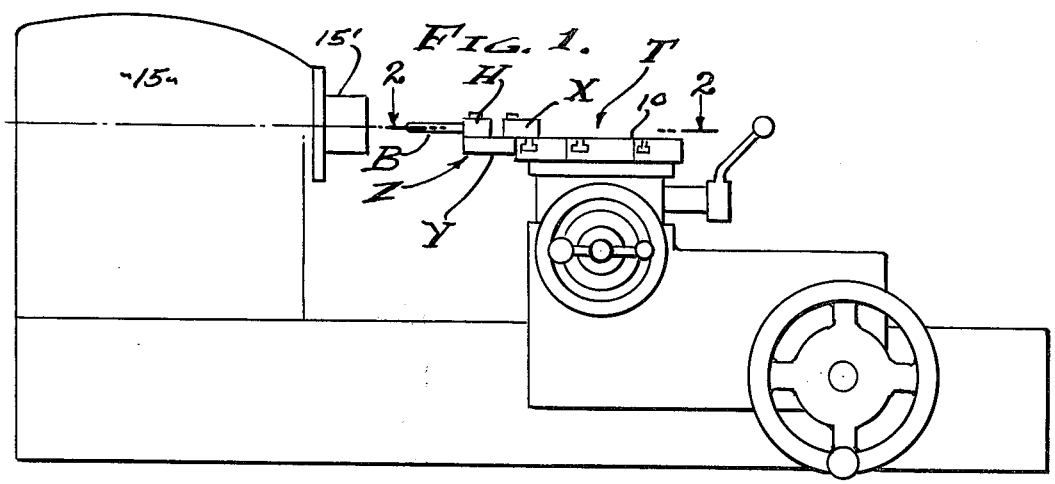
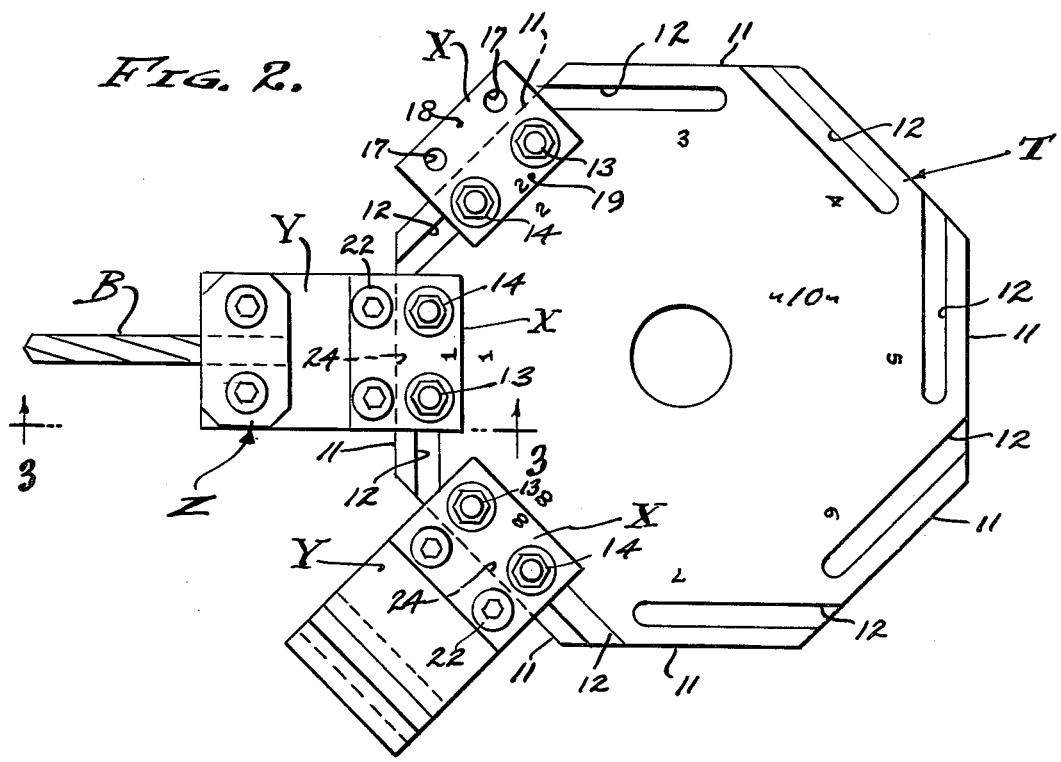
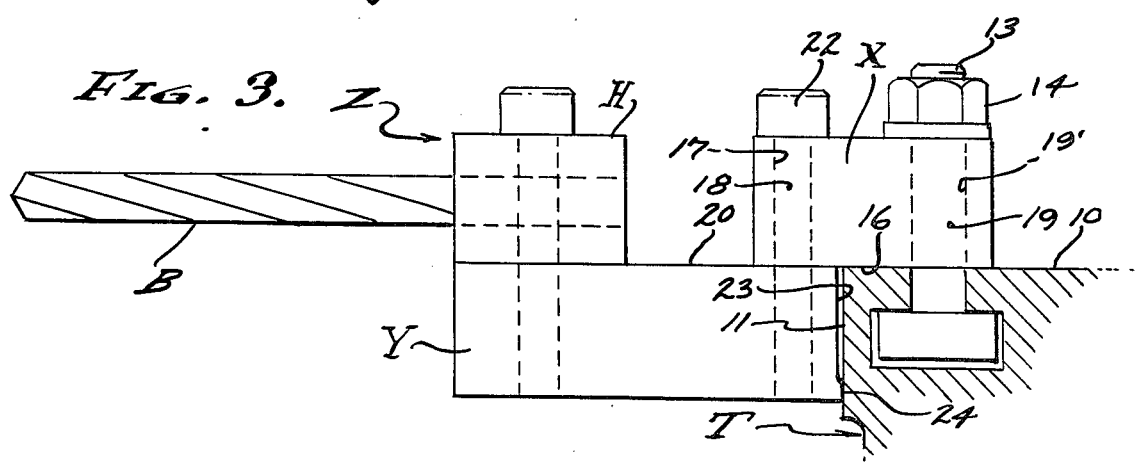

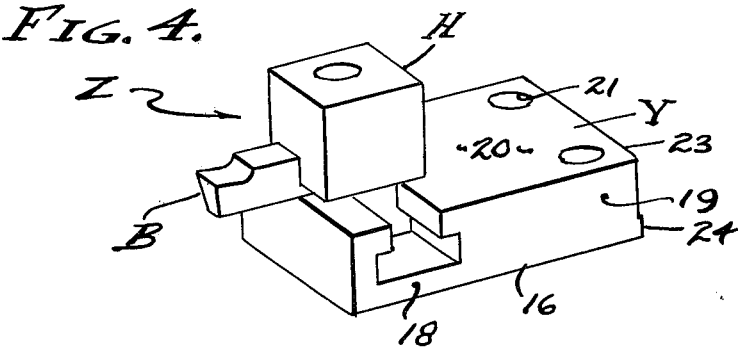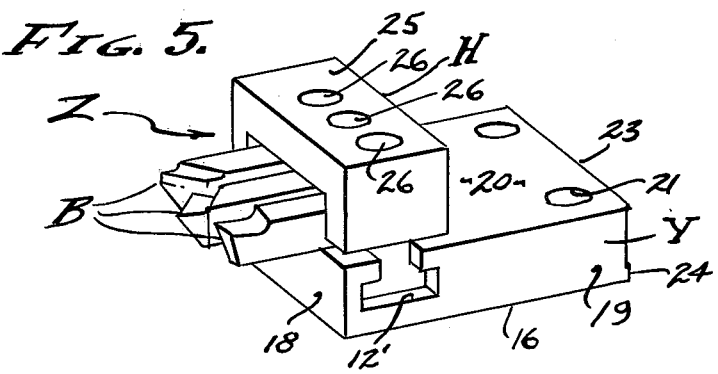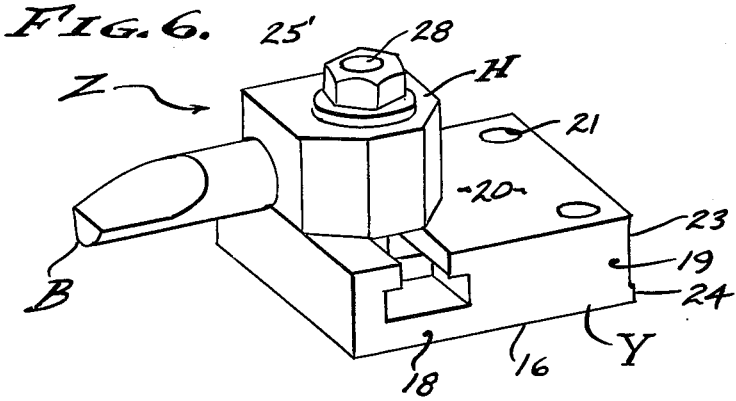

TOOL HOLDER CARTRIDGE FOR CHUCKING LATHES

BACKGROUND

This invention relates to turret tooling for production lathes known as "Chucking Machines". This type of lathe has a headstock and spindle to turn the work, and is characterized by a multi faced turret that carries multiple tooling, a usual "chucker" having an eight sided turret for the reception of eight distinct tool holders that are replaceable to the requirements of the work to be machined. There is a variety of tool holders to carry single, double and triple bits, to carry boring bars, drills and taps, and to carry taper slides etc. Heretofore, tool holders have been adjustably installed on the turret to suit each job situation, with the result that "setup time" is involved, and in the case of complex and/or precision machining the setup time can be very costly and to the extent that in many instances a chucking machine is devoted entirely to the manufacture of a single work piece, or in some instances certain stations thereof are left on the turret in readiness for repeat orders of a certain work piece. In other words, setup is many times so critical and difficult that it is not economical to remove tool holder setups. However, with the present invention it is an object to provide a replaceable tool holder cartridge upon which a tool setup is established and which can be removed and reinstalled in exact alignment with respect to the turning axis of the lathe spindle and the tool positioning face of the turret. It is to be understood that a multiplicity of tool holder cartridges is applicable to a turret, one at each indexing station thereof.

A feature of chucking lathes is that the top face of the turret is an accurately machined flat positioned a certain distance below the spindle axis, for example ⅜ inch for the use of ⅜ inch tool bits. Further with respect to the turret, the vertical side face at each index station is accurately machined at a normal angle to the first mentioned top face and accurately positioned radially from the turning center of the turret. It is an object of this invention to advantageously employ the aforementioned accuracy in the placement of a tool cartridge which can be initially set up and then used, removed and reused without subsequent setup. With the present invention, the tool holder cartridge is preferably set up for the one index station at which it is to be used, and no other. The top face of the turret at said use station is employed to determine height positioning of the setup, and the side face of the turret at said use station is employed to determine radial positioning of the setup, while the horizontal positioning with respect to the turning axis is determined by the adjustable positioning of an adapter held by hold-down bolts engaged in transverse T-slots in the turret. Accordingly, the tool holder cartridge of the present invention provides a supporting face for accurate positioned engagement with the top face of the turret, and provides a locating face for accurate positioned engagement with the side face of the turret. Thus, exact replacement of the tool holder cartridge is made possible.

The top face of the turret is the plane upon which the tool holders made for these chucking machines are designed to be supported, so as to place the cutting point or edge of the bit at the height of the turning axis. And, heretofore the said tool holders have been applied directly onto said top face with the tool bits cantilevered from the side face of the station at which they are installed. Characteristically therefore, the setup assembly at each station has involved the combination of tooling parts with the turret per se. However, with the present invention it is an object to provide a complete self-contained replaceable cartridge that can be permanently set up for installation at a certain station, and thereby capable of exact positioning when reinstalled. With the present invention, tool bits, drills, taps etc. are permanently set up singularly or in groups on this tool holder cartridge which provides an extension of the top face of the turret, an attachment that cantilevers from the side face of the turret where it is adjustable for transverse placement by means of the usual methods and use of instruments such as a dial indicator.

Tool setup involves the angular and linear placement of the bits, cutting elements, and in this respect it is an object of this invention to include predetermined angularity and/or linear placement of the cutters in the cartridge setup. With the present invention, the disposition and angularity of the cutting tools and/or bits is permanently established with respect to the cartridge by removing the combination to a comparator or the like prior to installation of the setup cartridge on the turret of the lathe. Thus, when using form tools and the like, angularity placement as well as linear placement of the tools is pre set in the cartridge combination.

SUMMARY OF INVENTION

A cartridge is provided for setting up tool holders with tool bits and the like permanently adjusted for reuse. That is, a setup is preserved on the cartridge which can be removed from the machine tool and replaced in exact position for subsequent use. It is the turret lathe and particularly the chucking machine with which the cartridge of the present invention is advantageously employed. In the chucking machine, the turret top face is offset from the turning axis a distance equal to the tool bit cross section, commonly ⅜ inch. It is this top face that is extended by this cartridge, and upon which a permanently but removable and replaceable setup is established. The turret of the usual chucking machine has eight index stations, and it is to be understood that a cartridge can be installed at each station, to be replaced by other setup cartridges and reused thereat as circumstances require. In accordance with this invention the cartridge involves, generally, an adapter X secured to the turret by the usual hold-down bolts, and a setup arm Y exactly positioned by the adapter which is permanently secured to an index station of the lathe turret T. The removable cartridge Z per se is comprised of the setup arm Y and tool holder H that positions the cutting tool bit B or the like.

DRAWINGS

The various objects and features of this invention will be fully understood from the following detailed description of the typical preferred form and application thereof, throughout which description reference is made to the accompanying drawings in which:

FIG. 1 is a side elevation of a chucking machine with the cartridge and adapter therefor applied to one face of the carriage turret.

FIG. 2 is an enlarged plan view taken as indicated by line 2—2 on FIG. 1, with two additional adapters installed, and one with a setup arm applied thereto.

FIG. 3 is an enlarged detailed sectional view taken as indicated by line 3—3 on FIG. 2.

FIGS. 4, 5 and 6 are perspective views of three typical cartridge setups made in accordance with the present invention.

PREFERRED EMBODIMENT

The tool cartridge of the present invention is intended primarily for use on a chucking machine, a lathe characterized by a multi position turret, for example a turret with eight index stations. A feature of these machines is the flat top face 10 of the turret T offset from the turning axis a distance equal to the height dimension of the usual cutting tool bit B. Another feature of these machines is the flat vertical side face of the turret T at each station. It is significant that the dispositions of faces 10 and 11 are accurately placed and machined smooth so as to be suitable for positioned engagement of the cartridge. Each turret station is provided with a transverse T-slot 12 for the reception of the head of hold-down bolts 13 secured by nuts 14 to clamp a setup in place. As shown, the T-slot 12 of one station opens at the next adjacent counterclockwise station for access for insertion of the bolt heads therein, the said slot extending parallel to the transversely disposed turret side face 11 (when positioned for use). Spaced from the turret horizontally along the axis of turning there is the usual headstock 15 and spindle 15' for revolving a work piece (not shown).

The adapter X for the cartridge is a hardened steel block that replaces the usual tool holder, and it is adapted to be permanently installed onto the top face 10 of the turret T. The adapter block is essentially a rectangular solid with a precision bottom face 16, and one or more and preferably a pair of precision locating bores 17. The face 16 is adapted to engage flatly with the top face 10 of the turret T, thereby to extend the plane thereof downwardly disposed beyond the side face 11. And the bores 17 are disposed on vertical axes spaced equidistant from and parallel to the side face 11. Thus, the adapter has a front portion 18 that projects radially from the turret side face 11, and it has a rear portion 19 that overlies the T-slot 12 at the marginal portion of the top face 10. Accordingly, one or more and preferably a pair of bores 19' extend vertically through the rear portion 19 to align with the T-slot and pass the hold down bolts 13 anchored in the said slot. The adapter block is secured in a permanently adjusted position by tightening of the nuts 14.

The setup arm Y is combined with a tool holder H and tool bits B to establish a replaceable cartridge setup. The setup arm is essentially a hardened steel block of rectangular solid form with a precision top face 20, and one or more and preferably a pair of precision locating bores 21 to align respectively with the bores 17 through the adapter X. The face 20 is adapted to engage flatly with the bottom face 16 of the adapter block, thereby to extend in the plane of the top face 10 of the turret T. Thus, the setup arm has a rear portion at bores 21 that underlies the radially projecting front portion of the adapter block, and it has a front portion that projects radially from the side face 11 of the turret T. Although a T-slot 23 can be duplicated (see FIG. 5) in the front portion of the setup arm to receive the tool holder H in a conventional manner, the said tool holder H can also be permanently located and adapted to the top face 20 as by means of cap screws (see FIG. 3). It is significant that the plane of top face 20 is coincidental with the plane of top face 10, with the coplanar bottom face 16 and adapter block establishing the precision coupling therebetween.

In accordance with this invention, the bores 17 and 21 are located with precision, to be doweled with precision pins, or preferably to receive precision cap screws 22 having ground shanks which pass through the adapter X and extend to threadedly engage into the setup arm Y. It is to be understood that the pin and thread interengagement can be separate if so desired. Thus, the setup arm Y is removable from the adapter X and replaceable in the same exact position when coupled to the same adapter from which it was removed. Accordingly, the various setup arms to be used are marked as by numbering, to be coupled to certain adapters on the turret where the initial setup was established.

The setup arm Y cantilevers from the side face 11 of the turret T and is placed thereagainst to take downward thrust imposed upon the tool bit B when cutting. Although the entire rear face 23 can engage flat against the side face 11, it is preferred that the lower margin 24 thereof project to engage face 11, thereby avoiding wedging and/or rocking movements between the two faces. In practice, the setup arm Y is of substantial depth, in which case the bracing line of margin 24 is so removed from the hinge point of joinder between the parts at the cap screws 22, that a stable lever arm is provided to support the cantilever.

The tool holder H is combined with the setup arm Y to make the cartridge Z of the present invention, a typical assembly being shown in FIG. 5 of the drawings where a T-slot 12' is employed for adjustable securement of the body 25 which accommodates three tool bits B. The tool bit cross section is for example ⅜ inch, and each is depressed by a set screw 26 through body 25 so as to flatly engage with the top face 20 of the setup arm Y, and with the cutting points at the horizontal plane of the turning axis of the machine tool. In FIG. 6 of the drawings there is shown a boring bar B' set in a body 25' fixedly secured to the top face 20 as by means of a screw fastener 28. It will be apparent therefore that the application of tool holders H will vary as circumstances require.

From the foregoing it will be apparent that I have provided a new and useful tool holder cartridge for use in production machines where setup time is critical to economy. Instead of making a new setup at the various turret stations on each production run of a part, the established tooling previously setup is simply reinstalled by replacement on the same adapter and at the same turret station previously employed therefor in each instance. Thus, the requirement for a new setup is virtually eliminated, and a simple inspection for accuracy will suffice.

Having described only a typical preferred form and application of my invention, I do not wish to be limited or restricted to the specific details herein set forth, but wish to reserve to myself any modifications or variations that may appear to those skilled in the art:

I claim:

1. A production lathe adapter and setup arm for preserving setups to be reused on multi station turrets that sequentially index cutting tools into cutting position with respect to work turned by the lathe, the turret having a top face offset from and parallel with a turning axis, and including; at least one adapter having a bottom face fixedly secured to the turret and cantilevered therefrom at one station thereof, a setup arm having a top face releasably engaged with the cantilevered bottom face of the adapter, and coupling means securing the setup arm to the adapter, the top face of the setup arm projecting radially from the turret coplanar with the top face thereof for receiving holder means to set up a cutting tool engageable with the work.

2. The production lathe adapter and setup arm as set forth in claim 1, wherein the setup arm underlies the adapter to overlap the same and extend radially from the turret station, and wherein the coupling means joins the said overlap.

3. The production lathe adapter and setup arm as set forth in claim 1, wherein the setup arm underlies the adapter to overlap the same and extend radially from the turret station, and wherein the coupling means joins the said overlap and includes at least one pin exacting position of the setup arm to the adapter.

4. The production lathe adapter and setup arm as set forth in claim 1, wherein the setup arm underlies the adapter to overlap the same and extend radially from the turret station, and wherein the coupling means joins the said overlap and includes a pair of spaced pins exacting position of the setup arm to the adapter.

5. The production lathe adapter and setup arm as set forth in claim 1, wherein the setup arm underlies the adapter to overlap the same and extend radially from the turret station, and wherein the coupling means joins the said overlap and includes a pair of spaced pins engaged through the setup arm and adapter and threaded into one to secure it to the other.

6. The production lathe adapter and setup arm as set forth in claim 1 combined with the holder means comprised of a body adjustably secured to the setup arm and with means to adjustably set said cutting tool.

7. The production lathe adapter and setup arm as set forth in claim 1 combined with the holder means comprised of a body conforming to and engageable with a T-slot in the setup arm and fixedly positioned thereto by set screws tightening against the cutting tool.

8. A production lathe adapter and setup arm for preserving setups to be reused on multi station turrets, each station having a side face normal to and depending from a top face offset from and parallel with a turning axis and that sequentially indexes cutting tools into cutting position with respect to work turned by the lathe, and including; at least one adapter having a bottom face engaged with and fixedly secured to the top face of the turret and cantilevered from the side face at one station thereof, a setup arm having a top face releasably engaged with the bottom face of the adapter, and coupling means securing the setup arm to the adapter, the top face of the setup arm projecting radially from the turret coplanar with the top face thereof for receiving holder means to set up a cutting tool engageable with the work.

9. The production lathe adapter and setup arm as set forth in claim 8, wherein the setup arm underlies the adapter to overlap the same and extend radially from the side face of the turret station, and wherein the coupling means joins the said overlap.

10. The production lathe adapter and setup arm as set forth in claim 8, wherein the setup arm underlies the adapter to overlap the same and extend radially from the side face of the turret station, and wherein the coupling means joins the said overlap and includes at least one pin exacting position of the setup arm to the adapter.

11. The production lathe adapter and setup arm as set forth in claim 8, wherein the setup arm underlies the adapter to overlap the same and extend radially from the side face of the turret station, and wherein the coupling means joins the said overlap and includes a pair of spaced pins exacting position of the setup arm to the adapter.

12. The production lathe adapter and setup arm as set forth in claim 8, wherein the setup arm underlies the adapter to overlap the same and extend radially from the side face of the turret station, and wherein the coupling means joins the said overlap and includes a pair of spaced pins engaged through the setup arm and adapter and threaded into one to secure it to the other.

13. The production lathe adapter and setup arm as set forth in claim 8 combined with the holder means comprised of a body adjustably secured to the setup arm and with means to adjustably set said cutting tool.

14. The production lathe adapter and setup arm as set forth in claim 8 combined with the holder means comprised of a body conforming to and engageable with a T-slot in the setup arm and fixedly positioned thereto by set screws tightening against the cutting tool.

15. The production lathe adapter and setup arm as set forth in claim 8, wherein the setup arm has bearing engagement against the side face of the turret station to cantilever radially therefrom.

16. The production lathe adapter and setup arm as set forth in claim 8, wherein the setup arm has a rear face for bearing engagement against the side face of the turret station to cantilever radially therefrom.

17. The production lathe adapter and setup arm as set forth in claim 8, wherein the setup arm has a rear face with a lower margin spaced from the top face thereof for engagement against the side face of the turret station to cantilever radially therefrom.

18. The production lathe adapter and setup arm as set forth in claim 8, wherein the setup arm underlies the adapter to overlap the same, and wherein the setup arm has a rear face with a lower margin spaced from the top face thereof for engagement against the side face of the turret station to cantilever radially therefrom, and wherein the coupling means joins the said overlap.

* * * * *